No. 722,421. PATENTED MAR. 10, 1903.
A. CAMPBELL.
COTTON HARVESTER.
APPLICATION FILED JUNE 9, 1902.
NO MODEL. 2 SHEETS—SHEET 2.
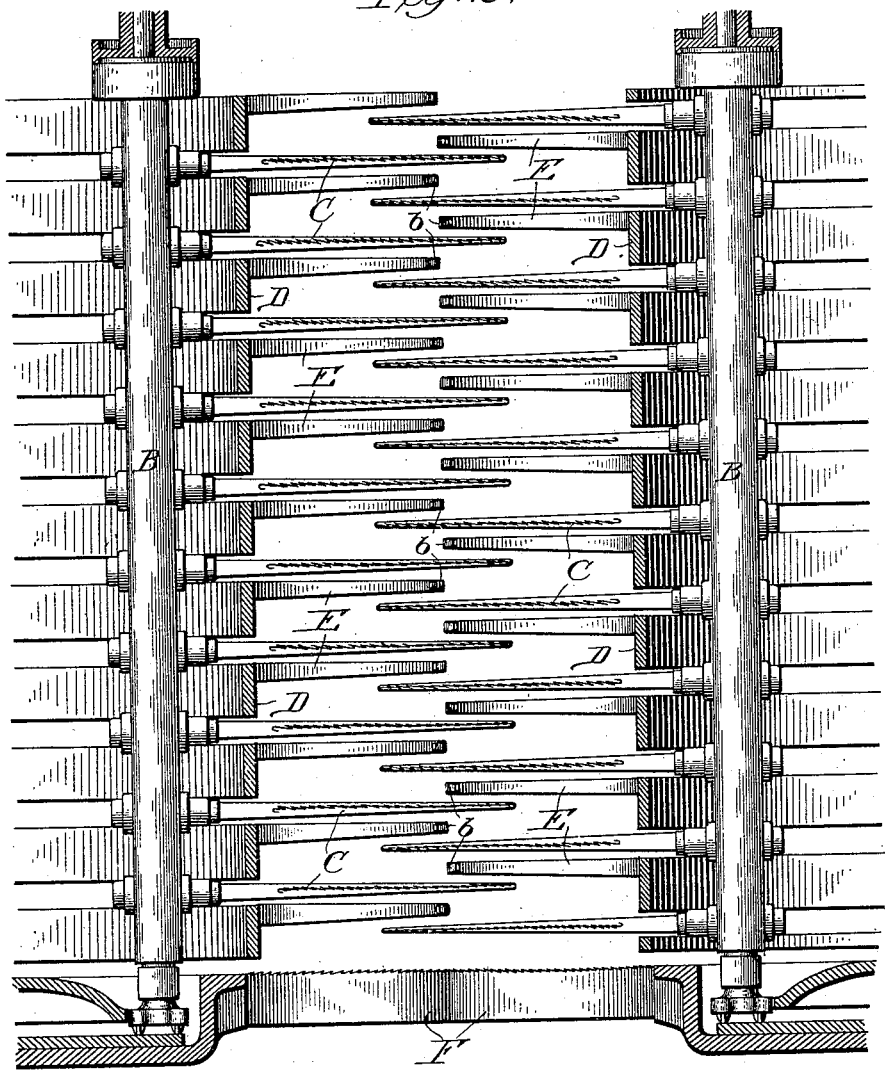
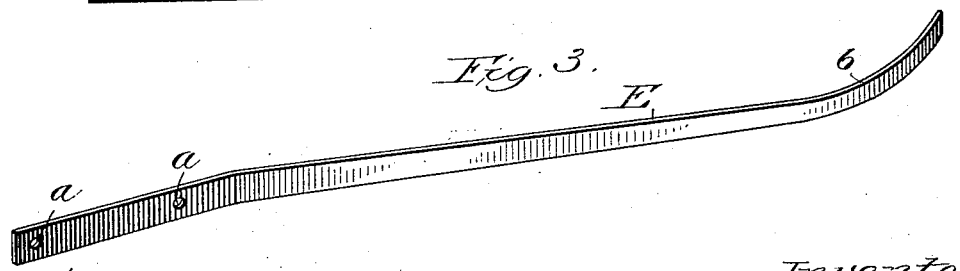
Witnesses:
Chas. E. Gaylord.
John Enders Jr.
Inventor:
Angus Campbell,
By Dyrenforth, Dyrenforth & Lee,
Att'ys.

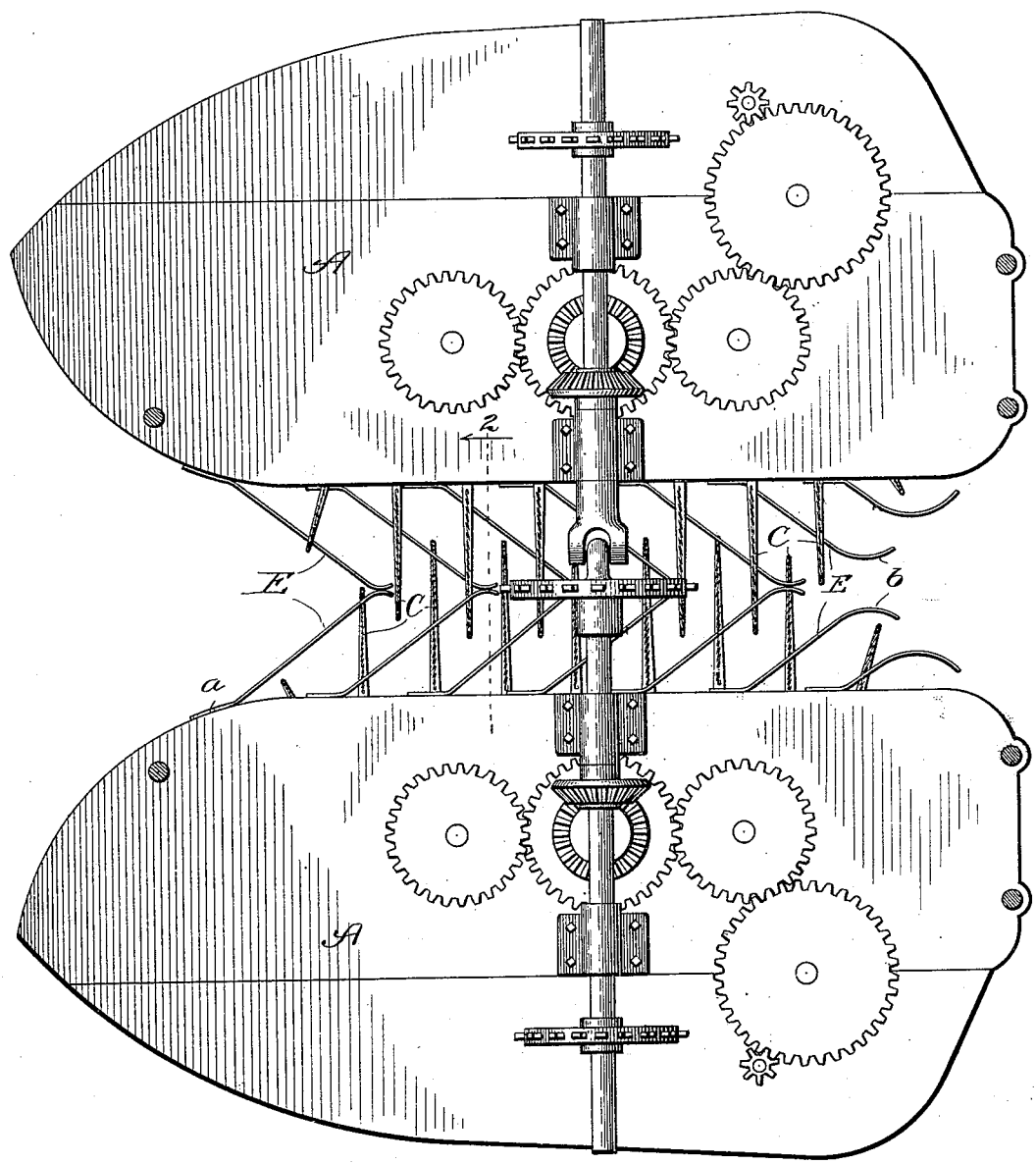

UNITED STATES PATENT OFFICE.

ANGUS CAMPBELL, OF PITTSBURG, PENNSYLVANIA, ASSIGNOR TO AMERICAN COTTON PICKER COMPANY, OF PITTSBURG, PENNSYLVANIA, A CORPORATION OF PENNSYLVANIA.

COTTON-HARVESTER.

SPECIFICATION forming part of Letters Patent No. 722,421, dated March 10, 1903.

Application filed June 9, 1902. Serial No. 110,805. (No model.)

*To all whom it may concern:*

Be it known that I, ANGUS CAMPBELL, a citizen of the United States, residing at Pittsburg, in the county of Allegheny and State of Pennsylvania, have invented new and useful Improvements in Cotton-Harvesters, of which the following is a specification.

My invention relates to improvements in cotton-harvesting machines, more especially of the class in which series of axially-rotating cotton-picker spindles are in the forward progress of the machine across the field thrust longitudinally to an extended position in the plants, caused to remain in the extended position for a prolonged period of time, and then withdrawn longitudinally from the plants and passed through stripper mechanism.

A machine operating upon the above principle was first shown and described in Letters Patent of the United States No. 542,794, granted to me July 16, 1895, and later in Nos. 685,439 to 685,443, inclusive, granted to me October 29, 1901.

It has been found in practice, while operating cotton-harvesting machines of the above class as hitherto provided, that when gathering short staple cotton and moving rapidly across the field small tufts or locks of cotton are frequently thrown from the picker-spindles by centrifugal force and fall to the ground.

My present object is to provide cotton-harvesting machines, more especially of the class defined, with certain improvements which tend to prevent such waste of cotton and in other ways increase the efficiency of the machines.

In carrying out my invention I provide upon the adjacent longitudinally-extending slatted sides of the machine-casings series of light yielding spring strips or leaves between the horizontal paths of the rotating picker-fingers.

Referring to the drawings, Figure 1 is a top plan view of so much of a cotton-harvesting machine as is necessary to illustrate my present improvements; Fig. 2, an enlarged broken vertical section on line 2 in Fig. 1, and Fig. 3 an enlarged detail perspective of one of the spring strips or leaves.

A A are the casings of the machine, in which the carriers B B travel.

The general construction and operation of the cotton-harvesting machine are now well known, and reference is had to my aforesaid Letters Patent for a more detailed description thereof. It will suffice to say that the cotton-picker spindles C, which are preferably of the construction described in the aforesaid Letters Patent No. 685,439, are upon endless series of pivotally-mounted carriers B, each supported to travel an endless course oblong in the direction of the length of the machine, whereby the axially-rotating picker-spindles are thrust, near the forward end of the machine, longitudinally to an extended position into the plants, rotated and moved during a long period of such extension in the backward direction, and then withdrawn longitudinally from the plants near the rear end of the machine, after which they travel in the forward direction and are drawn between stripper-strips, which remove the gathered cotton therefrom. In the machines as I prefer to construct them there are in each of the two casings A fifteen vertically-disposed carriers B, each provided with picker-spindles C, of which there are eleven on each of the carriers in one casing and ten on each of the carriers in the other casing. In the movement of the machine across a row of cotton-plants the picker-stems intermesh, as illustrated in Fig. 2, and move in the backward direction at approximately the speed of the forward movement of the machine, whereby they rotate in approximately stationary positions with relation to the plants while gathering the cotton therefrom. This tends to prevent the spindles from slapping against the stems, twigs, and bolls of the plants in a manner to injure them. The inner faces of the casings are formed of longitudinally-extending slats D, presenting horizontal slots between them for the passage of the spindles.

My present improvement consists in providing the light yielding springy leaves, fingers, or strips E upon each of the slats D between the paths of the horizontal series of spindles C. The leaves or strips E are preferably of tempered steel and are made as thin and narrow as possible consistent with the strength required. They are fastened by means of screws or otherwise at $a$ $a$ to the slats D and extend thence horizontally in a backward inclined direction to a point approximately midway between the casings A, where their ends $b$ are curved in the backward direction, as indicated. In the drawings I have shown seven spring strips or leaves E on each slat D between the paths of the picker-stems, and this number may be increased or diminished as desired. It has been found in practice in gathering cotton with fibers of average length that the best results are obtained by providing the picker-spindles of a certain diameter and taper and causing them to rotate at a certain predetermined relative speed while in the plants. They will thus gather and hold the fibers of cotton of the said average length or of greater length without danger of material loss. Where the cotton is of very short fiber, however, it has been found that it does not become sufficiently wound upon the picker-spindles to prevent a portion thereof from being thrown off by centrifugal force. The spring leaves or strips E are close to the paths of the axially-rotating spindles and tend to hold the fibers thereon against danger of being thrown off by centrifugal force.

It has been found in practice that my improved spring leaves or strips E increase the efficiency of the machine to a degree estimated at about ten per cent. in the passage of the machine once across the plants. This is by reason of the fact that the spring leaves or strips tend to hold the cotton-bolls up to the fingers and turn them in a manner to cause them to present different sides to the picker-stems as the spring leaves or strips move across them. Furthermore, they tend to prevent the cotton as it is gathered by the picker-spindles from accumulating at the heels of the spindles so close to the nuts thereon that the stripper mechanism in the machine cannot get behind the cotton. The spring leaves or strips as I prefer to provide them are so light and yielding in the horizontal direction that they will not injure the plants in the least, but rather tend to hold the twigs and bolls steady against the pulling force exerted by the spindles while gathering the cotton.

In the drawings, Fig. 2, I show a cotton-catching platform F, which may be formed of springy strips, in accordance with the description contained in my aforesaid patent, No. 685,443. The strips which compose the platform F are closer together and are for a different purpose than the leaves or strips E, which are the novel feature of the present construction.

Although I prefer to construct my present improvements throughout as shown and described, they may be variously modified in the matter of details of construction without departing from the spirit of my invention as defined by the claims.

What I claim as new, and desire to secure by Letters Patent, is—

1. In a cotton-harvesting machine, the combination with rotary traveling picker-spindles of yielding strips supported to extend between the paths of the spindles when in the cotton-gathering position.

2. In a cotton-harvesting machine, the combination with rotary traveling picker-spindles of yielding strips supported to extend from opposite sides in a backward-inclined direction toward each other between the paths of the spindles when in the cotton-gathering position.

3. In a cotton-harvesting machine, the combination with rotary traveling picker-spindles of yielding strips, curved at their free ends and supported at their other ends to extend from opposite sides in a backward-inclined direction between the paths of the spindles when in the cotton-gathering position.

4. In a cotton-harvesting machine, the combination with the slats, forming the inner casing-walls, and rotary traveling picker-spindles, movable between the slats, of yielding strips fastened to said slats and extending, in a backward-inclined direction, toward each other between the paths of the said spindles when in the cotton-gathering position.

ANGUS CAMPBELL.

In presence of—
  THOS. R. MORRIS,
  W. E. HOWELL.